United States Patent [19]
Sarka et al.

[11] 3,863,550
[45] Feb. 4, 1975

[54] CUTTING AND SCORING DIE

[75] Inventors: Albert J. Sarka, Fairview Park, Ohio; Pierson S. Kang, Pennsauken, N.J.

[73] Assignee: Chem Par Corporation, Montgomeryville, Pa.

[22] Filed: Mar. 19, 1973

[21] Appl. No.: 342,577

[52] U.S. Cl................. 93/58.3, 76/107 C, 83/694, 83/698
[51] Int. Cl............................................. B31b 1/20
[58] Field of Search ............ 83/686, 688, 694, 697, 83/681, 682, 652, 653; 76/107 C; 93/58.3, 58.4, 58.2 R

[56] References Cited
UNITED STATES PATENTS

| | | | |
|---|---|---|---|
| 1,701,546 | 2/1929 | Shaw | 76/107 C |
| 3,108,327 | 10/1963 | Phillips et al. | 76/107 C UX |
| 3,109,328 | 11/1963 | Giese | 76/107 C |

Primary Examiner—Frank T. Yost
Attorney, Agent, or Firm—Seidel, Gonda & Goldhammer

[57] ABSTRACT

A die for cutting and/or scoring of paperboard material is formed of a spaced pair of thin metal plates having aligned slots into which steel rules set on edge are inserted with their operative ends projecting through one of said plates, the spacing between the plates being maintained by filler material.

7 Claims, 11 Drawing Figures

CUTTING AND SCORING DIE

The present invention relates to improvements in steel rule dies of the type used in punching out box blanks from corrugated paperboard or the like.

Conventionally, dies for cutting and creasing paperboard blanks have been made by setting the steel rules for cutting the paperboard in predetermined pattern between individually cut wood blocks, designated "furniture" held in a steel frame or "chase" by wooden wedges called "quoins" with the edges of the rules extending above the blocks. Small blocks of sponge rubber or synthetic cork are generally placed on each side of the cutting rule to push the board free of the knives on completion of the cutting stroke. The creasing rules, in most systems, are glued to the wooden blocks. Other systems of dies are known in which the steel rules are inserted into grooves cut by jig saw into a slab of plywood of about three-fourths inch thickness in a predetermined pattern so that when the plywood die is brought to bear against the paperboard a blank of the desired configuration is stamped out.

Drawbacks have been encountered in the use of plywood dies made by conventional methods because of difficulties of cutting the grooves in plywood to precise dimensions and holding the same to tight tolerances. It has been proposed that the grooves in the plywood be produced by a laser beam, but it was found that laser cutting of the plywood results in a wider area at the base of the groove than at the uppermost surface thereof. As a result the steel rule is relatively loosely held within the groove and the desired dimensional precision and stability is not obtained. Additionally, the heat which is generated by the laser beam has a tendency to warp the plywood. Moreover, wood by its nature is sensitive to environmental conditions such as temperature, humidity, etc. and is subject to dimensional changes such as warping, swelling, shrinking, etc. with consequent deleterious effect on the operation of the dies made therefrom and curtailing their useful life. In addition, on replacement of the knives after a period of use, the new knife has to be inserted into a dieboard that has already suffered deterioration.

To overcome certain of the defects of such die assemblies heretofore employed, it has been proposed to replace these structures by a male die formed from a one-piece metallic plate bearing on its upper surface, the male scoring and cutting elements formed thereon by chemically etching away portions of the main metal surface to shallow depth, leaving in slight relief upstanding portions constituting the scoring and cutting elements. For cooperation with the male die member, there was also formed a complementary one-piece metallic female die having co-acting cutting and scoring elements likewise formed by etching of the surface of the metal plate (See, for example, U.S. Pat. No. 3,142,233). While the suggested use of the co-acting etched plates avoids certain of the drawbacks of the plywood die board assemblies, these are rather costly to manufacture and are restricted in practical application, because of the limited short height of the opposed cutting edges, rendering the dies so formed impractical for cutting and creasing heavier paperboard and particularly of corrugated board blanks.

Among the objects of the present invention is to provide a simple and inexpensive method for forming paperboard cutting and scoring dies utilizing steel rules which are fixedly set and retained in place in desired pattern and having an extended useful operating life. A further object is to provide a method and construction whereby the steel rules are placed and retained accurately in position on the dieboard assuring repeated precision in the designed geometric patterns cut and creased by these dies.

These objectives and other advantages hereinafter set out are obtained in accordance with the invention, by etching retaining slots in a spaced pair of thin metal plates having a spacing lamina of semi-rigid plastic sandwiched between said plates and having steel rules for cutting and or creasing rigidly retained in these slots and embedded in the plastic with the working edges of the rules extending beyond the outer surface of one of these plates.

The novel method for production of the dies in accordance with the invention will be understood and the advantages of the novel structure thereby obtained will be appreciated from the detailed description which follows, read in connection with the accompanying drawings illustrating a preferred embodiment.

Figure 2:
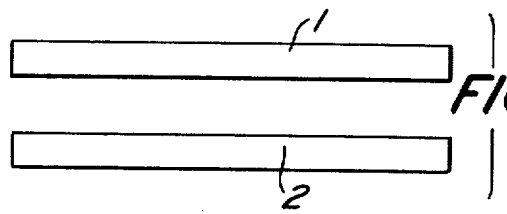
FIGS. 2 to 11 illustrate schematically the sequence of steps employed in making the die in accordance with the invention.

FIG. 2 shows in elevation a pair of plates, which may be of any suitable substantially dimensionally stable metal, such as copper, brass, magnesium, aluminum or any other common metal capable of being chemically etched, but the preferred metal is steel. Additionally, it should be noted that some substantially dimensionally stable plastics may also be used as the plates. The metal plates should have a thickness of about 0.034 inches, although no criticality is attached to the exact thickness provided it has sufficient rigidity for the desired purpose. It will be appreciated that thicker plates will require more etching time and the use of a greater amount of etching composition.

Figure 3:
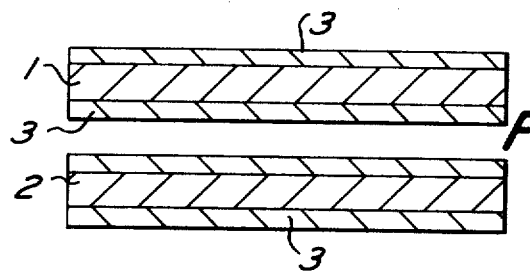

Having selected the plates, these are then coated on both sides with a light-sensitive resist composition 3. In FIG. 3 the plates are shown in cross-section with the resist applied. Any conventional light sensitive resist may be used.

Figure 4:
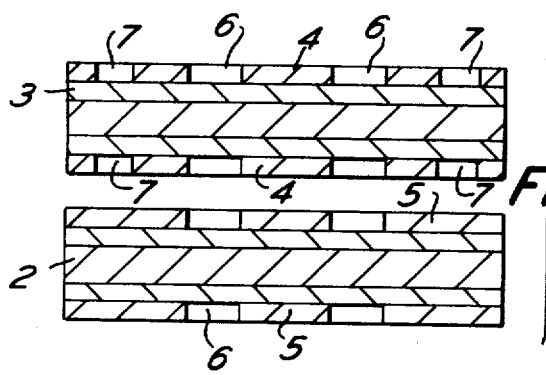

In the next step, as illustrated in FIG. 4, photographic negatives 4 are applied against the top and bottom of the upper plate 1, in contact with the resist and registering photographic negatives 5 similarly applied to both faces of the bottom plate 2. These negatives 4 and 5 bear images 6 of the pattern to be transmitted to the photosensitive resist 3. The negatives 4 and 5 are registering duplicates with the exception that the negatives 4 applied to the upper plates also contains images 7 of holes for reasons which will hereinafter appear. Each of the plates with the photographic negative thereon is exposed to a suitable light source, such as ultra-violet light, to effect transfer of the pattern image to the photosensitive resist in known manner. Thus, the clear areas of the negative permit the passage of light therethrough to fix the resist by photochemical action, while the dark or opaque areas of the negative corresponding to the images 6 and 7, are not penetrated by the light source.

In the illustrated embodiment the resist 3 and the photographic negatives 4 and 5 are shown as applied to both faces of each of the plates 1 and 2. While it would appear that similar results could be achieved by utilizing only a single face of each plate having a photosensitive coating thereon to which the negative is applied, the use of the resist and negative on both faces of each plate is preferred, since a sharper "cut" thereby providing a substantially perpendicular wall is obtained. Further more rapid dissolution of the metal is obtained in the subsequent etching operation to be described, when both faces of the metal plate have their exposed unresisted pattern available for contact by the etching composition. Moreover, by having the patterned resist on both faces of the plate, serving in the nature of templates, possible "undercutting" of the fixed resist by flow of etching composition thereinto, is reduced to a negligible minimum.

Figure 5:
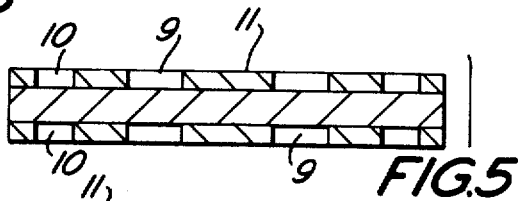

The photographic negatives after exposure to the light source, are removed from the respective plates, as illustrated in FIG. 5, leaving the transferred images on the resist layers 3. Thus, the pattern represented by the images 6 now appears at areas 9 of the several resists, while the impressions of the holes 7 now appear at areas 10 of the upper plate only. By suitable application of a solubilizing developer the resist is removed from the areas 9 and 10 while the photochemically fixed resist of the background 11 remains intact. The developer may be any conventional commercially available developer for the light sensitive resist used above.

Figure 6:
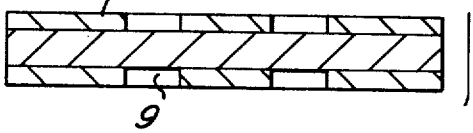

In the next step, illustrated in FIG. 6, a chemical etching composition is applied to each of the plates, which penetrates the areas 9 and 10, which are free of resist, and accordingly forms in the plates 1 and 2 etched out areas or slots corresponding to the original pattern on the photographic negative. There is thus formed in plates 1 and 2, slots 12, of a width corresponding to that of the steel rules to be inserted therein; and also in plate 1, holes 13 for purposes which will presently appear. The type of etching composition employed will depend, of course, on the kind of metal plate to be etched. Compositions employed for etching of different metals are known in the art and need not be described in detail. For example, nitric acid is usually employed in etching magnesium; the preferred composition for etching steel is an acid solution of ferric chloride or ferric chloride containing hydrochloric acid, or ferric nitrate. Acidic ferric chloride is also used in etching copper and copper alloys. The etching composition may be applied by spraying, padding, dipping, brushing or any other desired manner.

Figure 7:
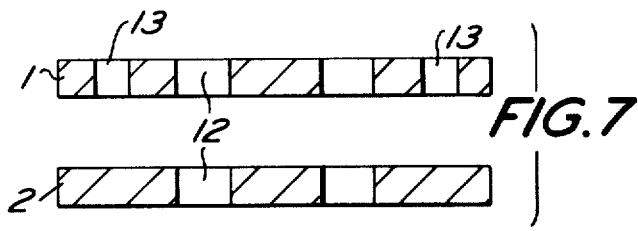
Figure 8:
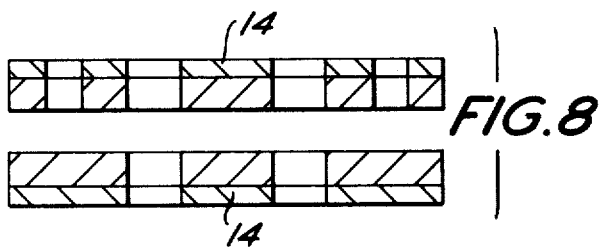

After etching of the metal plates has been effected, the remaining resist layer is removed (FIG. 7), and after chemically cleaning the plates, both the top face of the upper plate and the bottom face of the lower plate are coated with a mold release film 14 (FIG. 8). Any conventional commercially available mold release film may be utilized.

Figure 9:
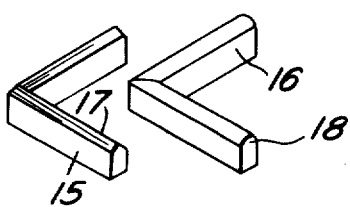

Steel rules, of a type shown in FIG. 9, are then made ready by bending and cutting to fit the slots 12 etched in the metal plates. Thus, FIG. 9 illustrates typical configuration of a cutting rule 15 and of a scoring rule 16. It will be noted that the upper portion of the cutting rule 15 is bevelled to provide a knife edge 17, while the upper edge of the scoring rule is rounded as indicated at 18.

Figure 10:
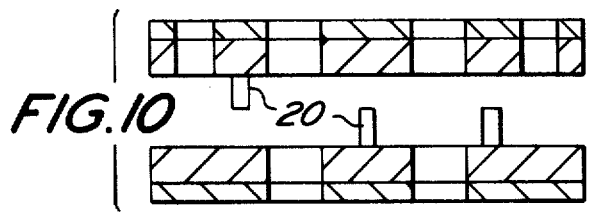
Figure 11:
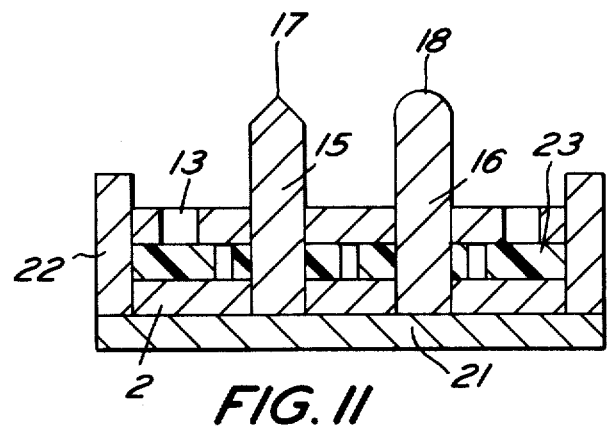

Returning now to the die plate as illustrated in FIG. 10; spacer posts 20 of a suitable length are welded or otherwise firmly affixed to the plates to provide an accurate laminating space between the plates. These posts may be, for example, of about a half inch in height. The spaced plates, with the posts fixed therebetween are then assembled in a molding fixture (FIG. 11) having a bottom 21 and side walls 22. The steel rules 15 and 16 are coated with mold release and then inserted firmly in the slots 12, and suitable plastic filler material 23 is injected through the holes 13 to fill the space between the plates and imbed the posts 20. The plastic is then cured to provide a semi-rigid laminated structure and the assembled die plate containing the steel rules is removed from the molding frame. The curing may be effected at ambient temperature conditions if desired.

For filler material 23, one may employ epoxy resin or any other thermoplastic or thermosetting resin material capable of being cured to a semi-rigid structure. This semi-rigid structure is obtained by adding a rubber compound such as polysulfide rubber into the epoxy resin. The rubber permits the filler material 23 to have a small degree of flexibility and yet provide adequate support for the steel rules. Other filler material may be used without departing from the scope and spirit of this invention. If desired, material such as wood, cork, certain types of rubber, or the like could be used although these are not preferred materials.

Figure 1:
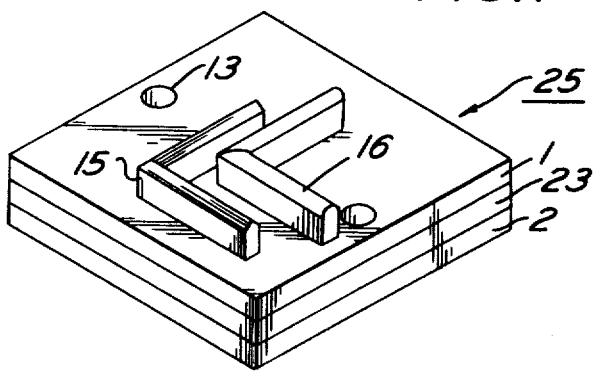
FIG. 1 is a perspective view of a representation of a completed die having a cutting and a scoring rule extending upwardly above the surface.

It will be understood that the representation of a finished die board illustrated in FIG. 1, is not intended to exemplify an actual pattern of assembled cutting and creasing rules such as would be employed in practice in cutting and creasing paperboard to desired configuration for boxes or cartons. These drawings have been simplified to facilitate the description of the manufacturing process.

For its intended use, the finished die board 25 is mounted on the cutting press in the customary manner, in juxtaposition to an opposing press member. Typically, on a flat bed press the opposing member will be a back up plate having a covering of hard counter paper. By bringing the back up plate into contact with the cutting and scoring dies an impression will be formed in the counter paper corresponding to the pattern arrangement of the cutting and scoring rules. The impressed areas of the counter paper are then removed, providing thereby in the counter paper a female counterpart of the male pattern arrangement of the rules in the cutting and scoring die board. The press is then ready to perform its function of cutting and scoring paper board fed thereto.

Because of the semi-rigid and precise vertical positioning of the rules in the die board, in contradistinction to that experienced with conventional plywood assemblies, the number of impressions that can be made in cutting and creasing corrugated paperboard is more than doubled.

While the die board of the present invention finds its most useful application in the cutting and scoring of corrugated paperboard such as is used in the manufacture of box blanks, its use is not limited thereto. Certain of the advantages of the novel die board, including accuracy and repeatability of the geometric pattern designed, are likewise obtained in cutting and scoring of non-corrugated paperboard carton blanks, plastic sheets and films, metal foil, and the like. The advantages of the die board of the present invention result principally from the following features:

1. The accurate location of the slots for retaining the steel rules and the ability to standardize the rules used in the dies.

2. Dimensional stability in the operating environment, substantially unimpaired by conditions of temperature, humidity, etc.

3. Durability of the die board structure which enables repeated reknifing and other handling without impairment of the accuracy of positioning of the steel rules. The old or damaged steel rules are pulled from the die board and pre-bent steel rules are reinserted into the same slots.

4. Simplified and accurate assembly, reducing the manufacturing costs otherwise entailed in skilled jig saw cutting, block cutting and other manual operations.

5. Increased metal rule life as a result of precise vertical placement of the rules and their freedom from loosening or displacement.

Other advantages will be apparent to those skilled in the art.

While a preferred embodiment of the invention has been described, it will be understood that such description is not intended to limit the invention, since certain obvious modifications and alternatives are available without departing from the spirit and scope of the invention. For example, instead of forming the slots in the metal plates by chemical etching, electrolytic etching can be employed. Since the plates are relatively thin, the slots could be etched in the plates by a laser beam, without encountering the objections heretofore noted in the use of a laser beam for cutting slots in ¾ inch plywood. Although the plates 1 and 2 are preferably indicated to be metallic, it is also possible to use plastic plates of suitable rigidity; in which event selection of the appropriate etching composition would have to be made.

We claim:

1. A cutting and scoring die comprising a superimposed pair of plates composed of substantially dimensionally stable material separated by an intermediate semi-rigid plastic material therebetween, said plates and plastic material having aligned slots therein extending from the outer face of one of said plates through the plastic material and into the opposed plate, each of said plates being substantially unitary and continuous except for said slots, and metallic rule members rigidly mounted in said slots and having their edges extending beyond the outer face of one of said plates.

2. A die as defined in claim 1 wherein said semi-rigid plastic material is an adherent lamina.

3. A die as defined in claim 2 wherein said plastic material is a cured epoxy resin.

4. A die as defined in claim 1 wherein said slots extend all of the way through both plates.

5. A die as defined in claim 1 wherein said plates are maintained in fixed spaced relation by spacing posts therebetween and fixedly attached to at least one of said plates, said posts being embedded in said plastic material.

6. A die as defined in claim 5 wherein said plates and said posts are made of metal and said posts are welded to at least one of said plates.

7. A die as defined in claim 1 where said plates are made of steel.

* * * * *